W. L. BLISS.
JUNCTION BOX.
APPLICATION FILED MAY 2, 1910.

1,039,248.

Patented Sept. 24, 1912.

Witnesses:
Robert H. Weir
Geo. B. Jones

Inventor:
William L. Bliss
By: Edwin B. H. Tower Jr.
Atty.

UNITED STATES PATENT OFFICE.

WILLIAM L. BLISS, OF MILWAUKEE, WISCONSIN, ASSIGNOR TO THE UNITED STATES LIGHT & HEATING COMPANY, OF NEW YORK, N. Y., A CORPORATION OF MAINE.

JUNCTION-BOX.

1,039,248.  Specification of Letters Patent.  Patented Sept. 24, 1912.

Application filed May 2, 1910. Serial No. 559,017.

*To all whom it may concern:*

Be it known that I, WILLIAM L. BLISS, a citizen of the United States, residing at Milwaukee, in the county of Milwaukee and State of Wisconsin, have invented new and useful Improvements in Junction-Boxes, of which the following is a full, clear, concise, and exact description, reference being had to the accompanying drawing, forming a part of this specification.

The object of my invention is to provide a simple and convenient junction or outlet box adapted particularly to be applied to the roofs of cars, although capable of general use.

Other objects of the invention are to provide a box which is easy of access and one in which the connections will not be subjected to excessive moisture.

While the invention may be embodied in a number of convenient forms, the one which I have worked out in practice constitutes a simple and practical embodiment of my idea, and is shown in the accompanying drawings, in which—

Figure 1:
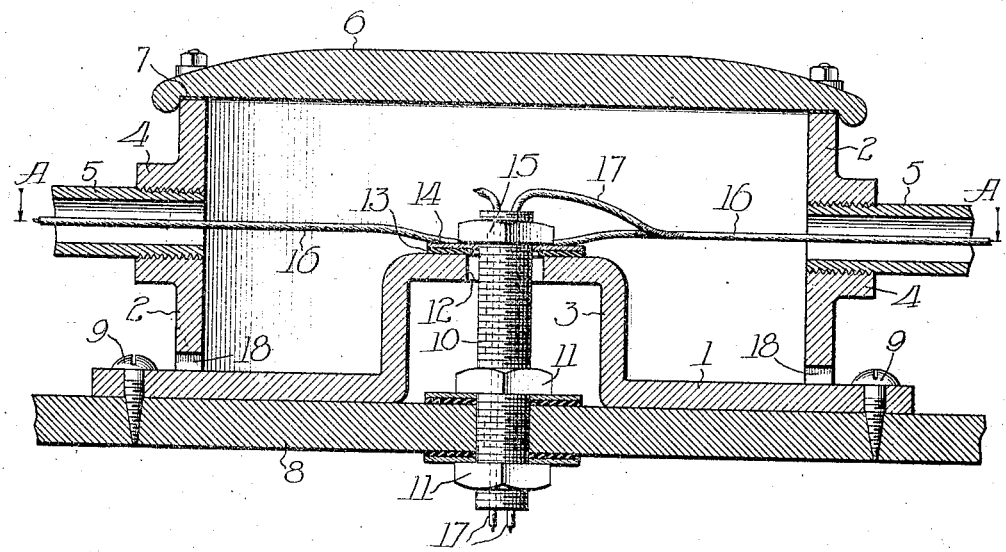
Figure 2:
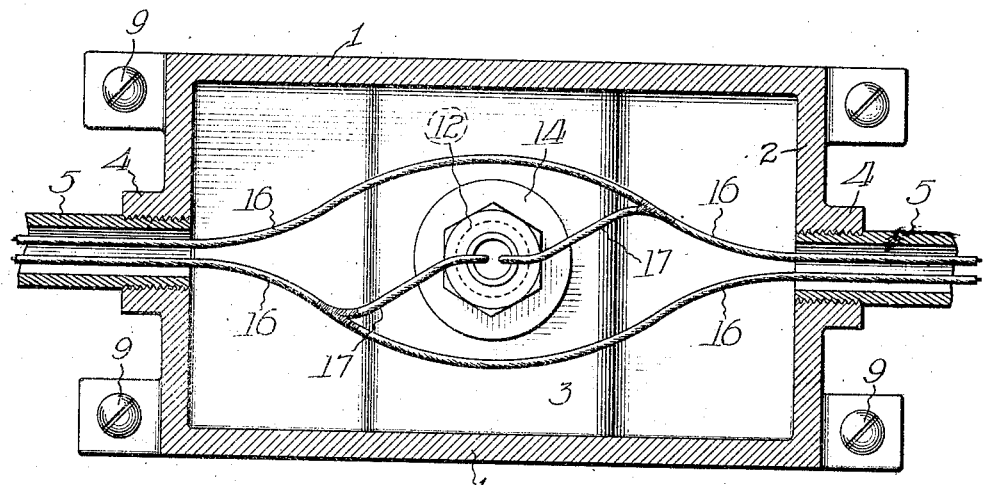
Figure 3:
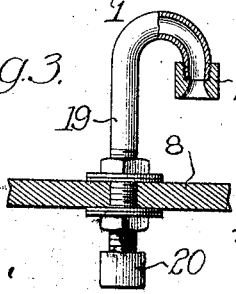

Figure 1 is a central longitudinal section showing the junction box applied to a suitable support. Fig. 2 is a longitudinal section on line A—A, Fig. 1. Fig. 3 is a modification of part of the structure, on a reduced scale.

In the preferred construction, the main body of the junction box 1, has end portions 2, and an intermediate raised portion 3. The ends 2 have thereon raised bosses 4, adapted to receive the screw-threaded ends of pipes 5 in the usual manner. The cover 6 is bolted or otherwise secured to the main body portion 1, in any suitable manner, and a gasket 7 is interposed between the cover and the box to provide a water-tight connection. The body portion may be secured to any suitable support, for example, the roof of the car 8, by means of screws 9 or suitable equivalents.

In order to provide a convenient method of leading off branch connections, I prefer to secure to the roof of the car 8 a threaded tubular member 10, which extends therethrough and is securely clamped by nuts 11—11 over washers and gaskets to make a water-tight joint. This tubular member extends up from the roof of the car a suitable distance so that in locating the junction box, it is simply necessary to fit it down over the tube 10, the end of the tube projecting through the hole 12 in the raised portion 3 of the base. The hole 12 is so large that accurate location of the junction box with reference to the tube, is not necessary.

A suitable gasket 13, washer 14 and nut 15 may now be applied to the upper end of the tube 10, to form a water-tight connection and to aid in securing the box in place on the roof of the car. The mains 16, which extend from one end of the outlet box to the other, may now be readily tapped with the branch wires 17—17 in any suitable manner.

The ends of the outlet box are provided with drainage holes 18, which prevent the collection of excessive moisture within the box. It will thus be seen that not only are all the joints water-tight, but that provision is made to drain off any moisture that may collect in the junction box, and further, that the hole in the base through which the branch wires enter, is elevated a considerable distance, so that there is no danger of water entering at this point.

In Fig. 3 is shown a modified form of tubular member through which the branch connections enter. The tube 19 has its upper end bent over, thus still further guarding against the entrance of moisture. The ends of the tube are provided with screw-threaded outlet bushings 20 to protect the insulation of the wires against chafing. It is obvious that protecting bushings may also be used with the tubular member 10 shown in Figs. 1 and 2.

I do not limit myself to the particular features of construction shown and described, but desire to include broadly any equivalent means coming within the scope of the appended claims.

What I claim as my invention and desire to secure by Letters Patent of the United States is:

1. A junction box having a raised portion, an opening in said portion for the exit of conductors, other openings in said box in substantially the same plane as the top of said raised portion, for the exit of additional conductors which are connected to said first conductors, drainage holes in said box, located lower than said raised portion, and a cover for said box.

2. The combination with a junction box, of a support therefor, a projecting member secured to said support, said junction box having a recessed portion adapted to fit over said member and provided with an opening to receive said member, conductors carried by said member and entering the box, openings in said box for additional conductors, said openings being located above the base of said box, whereby moisture is prevented from entering by any of said openings.

3. The combination with a junction box having a cover and external lugs, of a support, means for securing said lugs to said support, a tube secured to said support and projecting therefrom, said box having a raised portion across the base with an opening to receive said tube, a nut, washer and gasket on said tube to seal said opening, additional openings in opposite ends of said box adapted to receive threaded pipes, main leads passing through said box from said opposite openings, branch conductors secured to said leads and passing out through said tube, drainage openings in the walls of said box and a sealing gasket between said cover and said box.

In witness whereof, I have hereunto subscribed my name in the presence of two witnesses.

WILLIAM L. BLISS.

Witnesses:
GEO. B. JONES,
F. H. HUBBARD.